April 11, 1967 E. GRETEN ET AL 3,312,999
APPARATUS FOR THE CONTINUOUS MANUFACTURE
OF BOARDS FROM PARTICLE-LIKE SUBSTANCES
Filed Aug. 9, 1963 11 Sheets-Sheet 1

INVENTORS
ERNST GRETEN
PETER VAJDA

BY Robert W. Beach
ATTORNEY

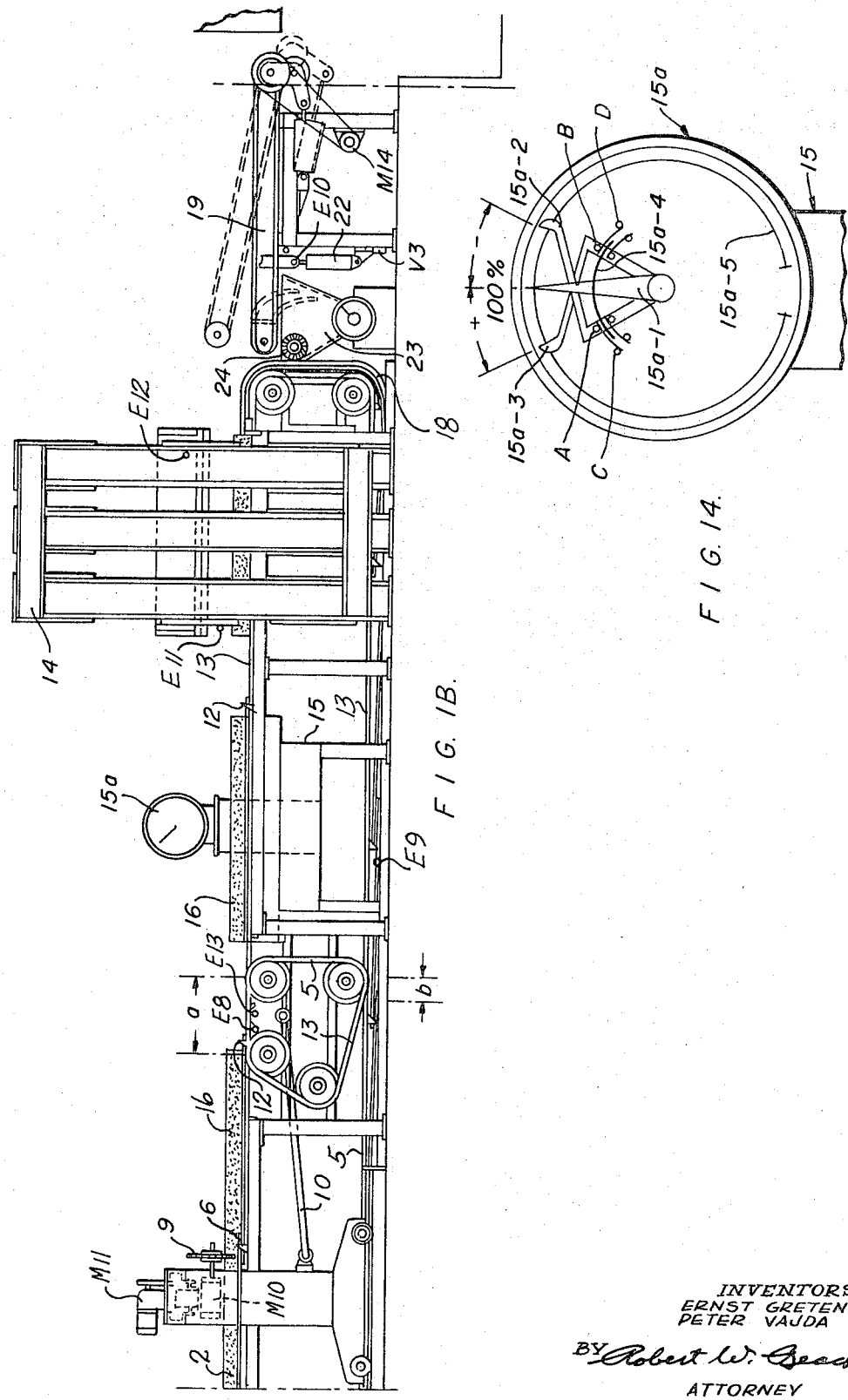

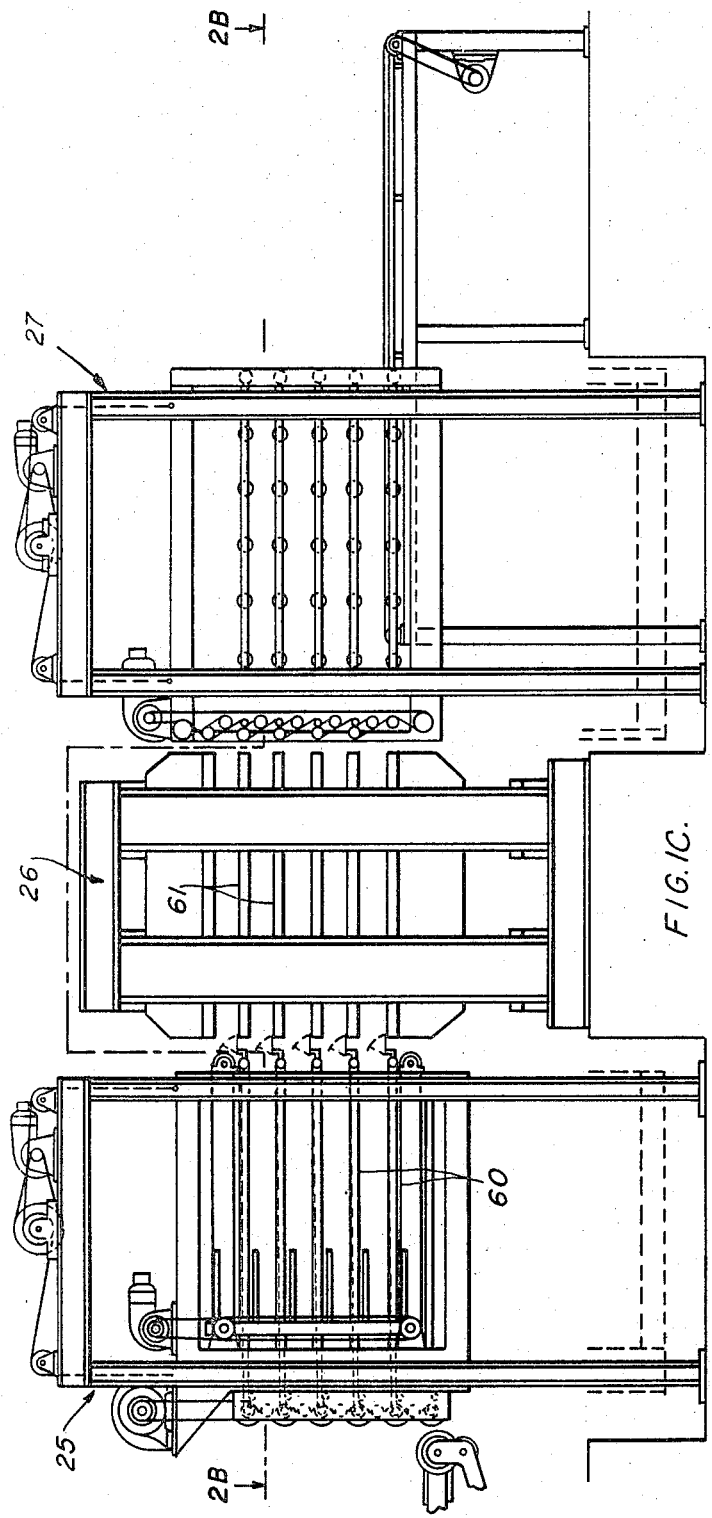

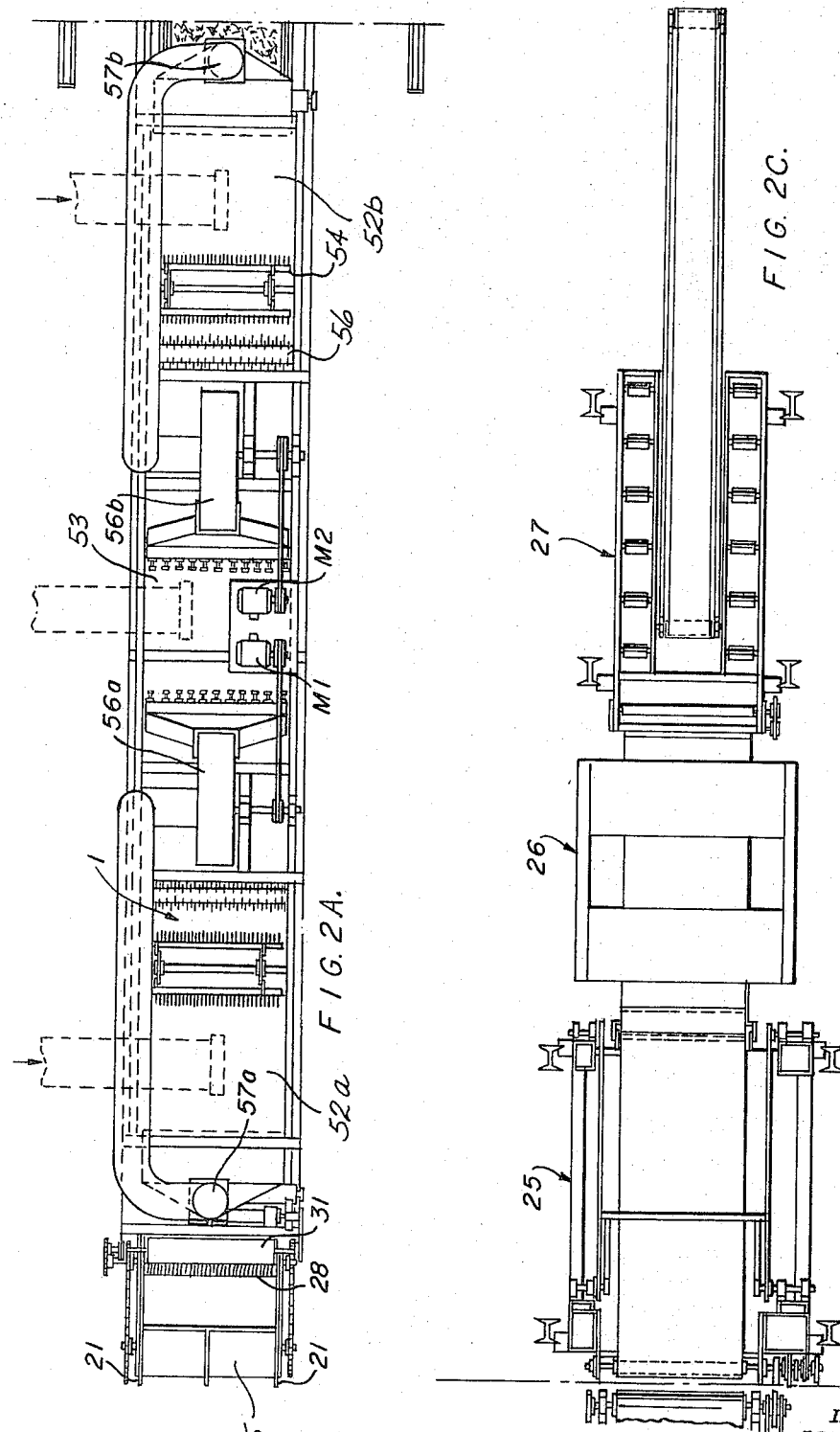

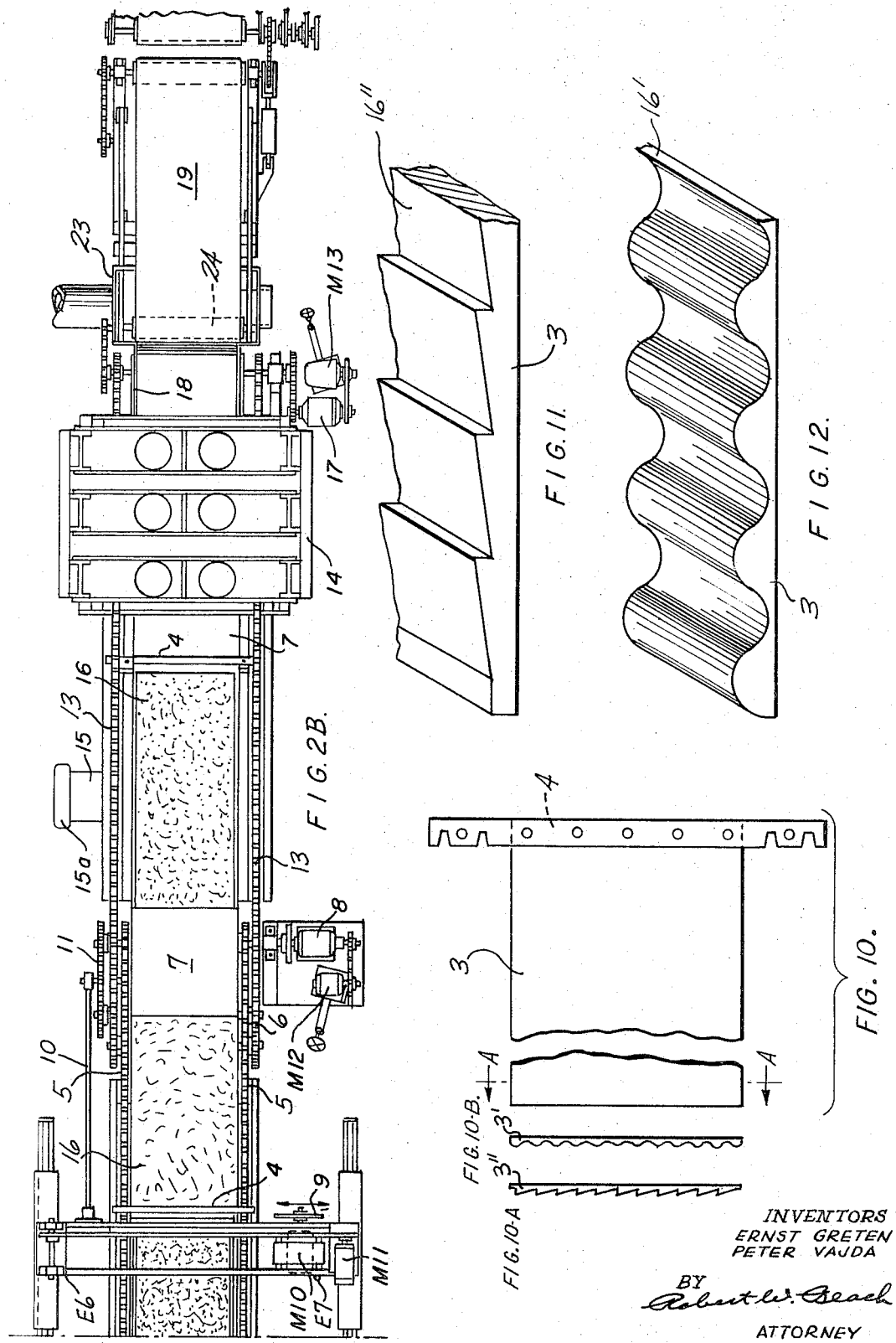

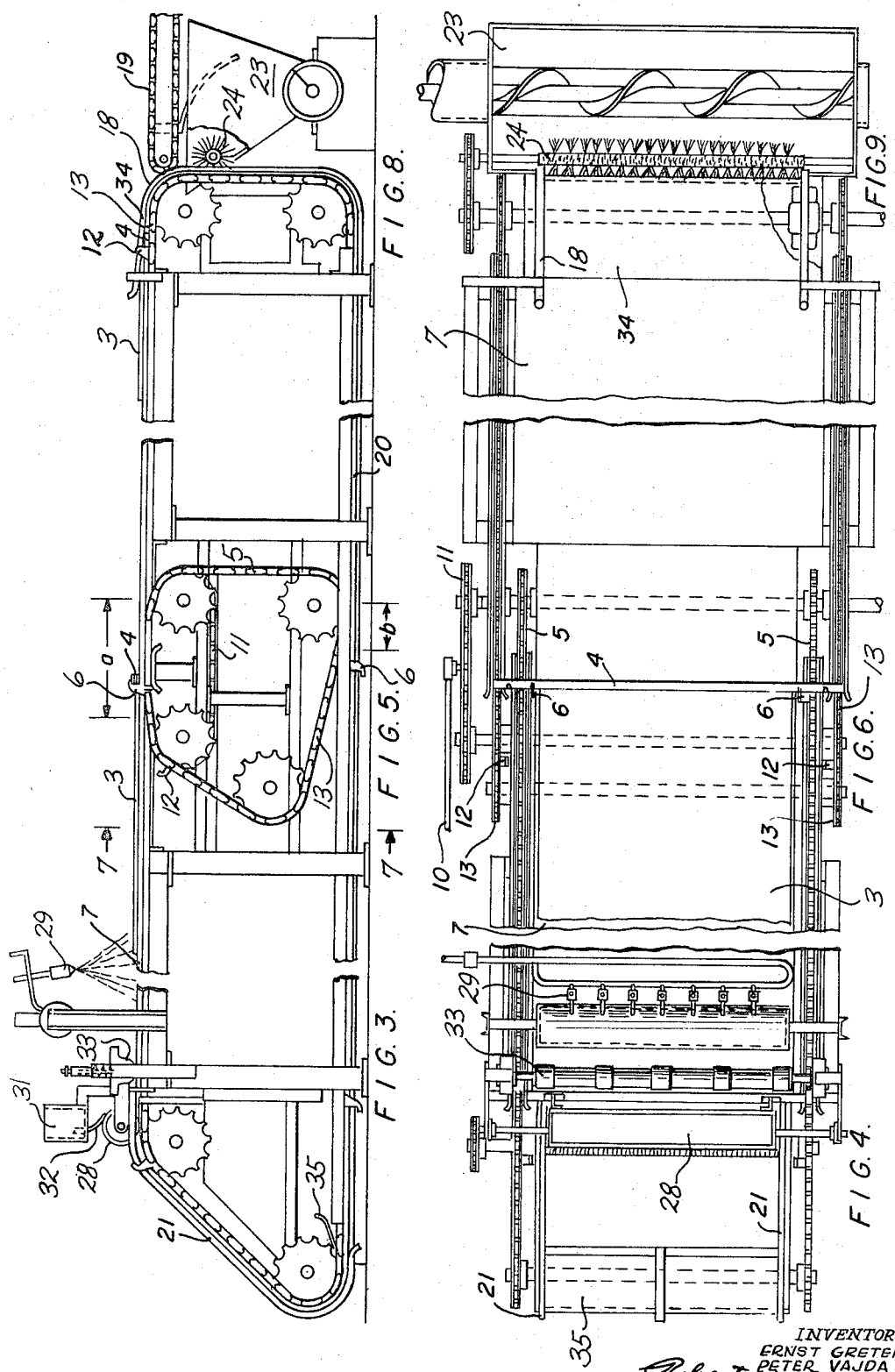

3,312,999
APPARATUS FOR THE CONTINUOUS MANUFACTURE OF BOARDS FROM PARTICLE-LIKE SUBSTANCES
Ernst Greten, Springe, Hannover, Germany, and Peter Vajda, North Vancouver, British Columbia, Canada, assignors to Bähre Metallwerk K.G., Springe, near Hannover, Germany, a corporation of Germany
Filed Aug. 9, 1963, Ser. No. 301,211
Claims priority, application Germany, Feb. 22, 1963, B 70,840
7 Claims. (Cl. 18—4)

This invention relates to an apparatus for the manufacture of boards from particle-shaped substances. In particular, the invention relates to the manufacture of boards from particle-shaped substances such as wood flakes, in which a mat is formed on a series of consecutively conveyed individual carriers. The mat is divided into individual pieces each carried by an individual carrier on which it is fed to a preliminary press where the mat is preconsolidated. After the mat has been preconsolidated the carrier is separated from the preconsolidated piece and the individual piece without the carrier is then fed to a finishing press.

Board-making systems of this type are well known in the art but all such systems operate with rigid sheet carriers, e.g. cauls, which, after being separated from the pressed pieces of mat, must be returned to the mat-forming location by means of special costly conveyor devices. In accordance with the known systems it is also necessary to provide a large and expensive amount of storage space adjacent the board-making machines for the storage and transportation of such rigid sheet carriers as well as facilities for cooling them.

Also when operating with continuous installations, it is unavoidable that several pieces of mat must be removed from the production line, especially when restarting production or when the installation is adjusted to another board thickness, since at such times some of the pieces formed will not meet the required standard weight. The removal of the mat formed on relatively large area, rigid sheets used in the past has required very costly scraper or tilting devices. It has also been necessary to take special precautions and use special devices for handling the empty sheets.

Methods are also known in which, after receiving a preliminary pressing, the pieces of mat are separated from the rigid sheet carriers and are passed to the finishing press without individual carriers. A disadvantage of this particular feature of the known systems is that the pre-pressed but still fragile pieces of mat must be pushed off or lifted from the rigid sheet carriers and this is not possible in the production of boards of large sizes without damage to the piece of mat because of the adhesion of the pieces of mat to the carriers.

The present invention solves the problem of overcoming these difficulties and disadvantages in that it uses flexible plates as carriers and these carriers are separated from the pre-consolidated pieces by peeling the carriers off the pieces while simultaneously transferring the preconsolidated pieces to a transfer means for feeding the preconsolidated pieces to a finishing press. The flexible plates are preferably peeled off the preconsolidated pieces by being rolled downward, and a particularly satisfactory separation is obtained when the plates are rolled downward by means of a downward pull on their forward ends. The thus separated flexible plates are then continuously conveyed back to the mat forming zone and during their return are cleaned. The cleaning is partially achieved by the flexing of the plates as they are rolled downward, which removes the layer particles, and this is immediately followed by brushing which removes the remaining particles and polishes the plates. The particles removed from the plates by the cleaning action are collected in a hopper and recycled back to the mat forming zone to be re-used. It is also desirable to apply a parting agent to the plates during their return to the mat forming zone which will help prevent sticking of the mats to the plate.

In accordance with the invention there is also provided a conveyor means for carrying the preconsolidated mat pieces to the finishing press after the carrier plates have been peeled off. This conveyor is movable such that when a mat piece is formed which does not meet specifications it will not be received by the conveyor to the finishing press but instead will be rejected into the hopper for collecting the particles removed from the plates. The position of this conveyor is controlled by means of a weighing scale which weighs each mat sheet which is formed. The weighing scale is located before the preliminary press and not only sets the conveyor in such position as to reject the mat piece but also locks the preliminary press in an open position so that the mat piece which does not meet specifications is not given a preliminary press.

Another feature in accordance with this invention is that the flexible plate can be either flat or may have a contoured surface and the contoured surface may either be a part of the actual plate or it may consist of an overlay which is movably fixed to a main plate. Such an overlayed contoured surface may either have the same flexibility as the main plate and remain with the main plate in a continuous cycle or the contoured overlay surface may be more rigid than the main plate so that it will not be peeled off with the main plate but will continue through the finishing press with the mat piece. The overlay surface can then be returned to the mat forming zone by any suitable means. When a contoured surface, e.g. rippled, striated, or any desired pattern, is used on the flexible plate, it is also desirable that the presses and the conveyor to the finishing press be provided with a similar configuration so that the shape produced on the mat pieces will not be damaged during the conveying and pressing operations.

The finishing press preferably consists of a multi-layer hot press into which the preconsolidated mat pieces are charged by means of a charging device having a series of individual levels consisting of endless belts which are inserted into the press and which deposit the mat pieces into the press by rolling them off. Since the mat pieces in their preconsolidated state are still quite fragile, care must be taken in transferring them from the conveyor to the press and for this purpose each charging belt of the charging device is provided with a movable wedge-shaped bar which upon insertion into the press is in an upright position so as to force the already pressed board out of the press and then when the preconsolidated mat pieces are deposited over the front roll of the charging belt the wedge-shaped bar is laid flat so as to serve as a bridge, thus preventing any unacceptable bending stresses on the mat pieces.

In addition to overcoming the difficulties which have been inherent in prior board making systems, a number of other very important advantages have accrued from this invention. Thus, by using a continuous return system for the flexible plates the physical size of the actual plant can be considerably reduced since space is no longer required to clean and store the plates. Also an important saving in binding resin for the wood flakes is realized since the fine particles of mats rejected because of improper weight which are cleaned off the plates and returned to the mat-forming section contain a large proportion of resin.

Another very important and practical advantage of this invention is that it is very easily adaptable to the production of boards of a very large variety of surface configurations. Thus, the surface of the boards may be grained, corrugated, etc., simply by inserting appropriate overlays on the flexible plates which may be peeled off with or without the flexible plates.

Finally, in accordance with the invention it is possible to obtain an extremely smooth surface on the boards produced. This is of particular interest when the surface of the boards are contoured since the contoured board is not sanded and represents the final surface on the product.

This invention will now be illustrated by reference to the attached drawings in which:

FIGURES 1A, 1B and 1C combined are a side elevation of a flake-board installation for a single-level preliminary press and a multi-level main press and flexible carrier plates.

FIGURES 2A, 2B and 2C combined are of the installation in FIGURE 1.

FIGURES 3 and 4 are a side elevation and a plan, respectively of continuously running conveyor chains prior to their entry into a forming station, to a larger scale than shown in FIGURES 1A and 2A.

FIGURES 5 and 6 are a side elevation and a plan, respectively, on a larger scale than shown in FIGURES 1B and 2B of the transfer location where the supports carried along by the continuously running conveyor chains are taken over by the cyclically operating conveyor chains.

FIGURES 8 and 9 are a side elevation and a plan, respectively, on a larger scale than shown in FIGURES 1B and 2B of the cyclically operating conveyor chains behind the preliminary press.

FIGURE 10 is a plan of a flexible mat support sheet attached to a carrier-bar and FIGURES 10A and 10B are transverse sections through different modifications of such support sheet on line A—A of FIGURE 10.

FIGURES 11 and 12 are top perspectives of examples of pressed panels with profiled surfaces.

Figure 1A:
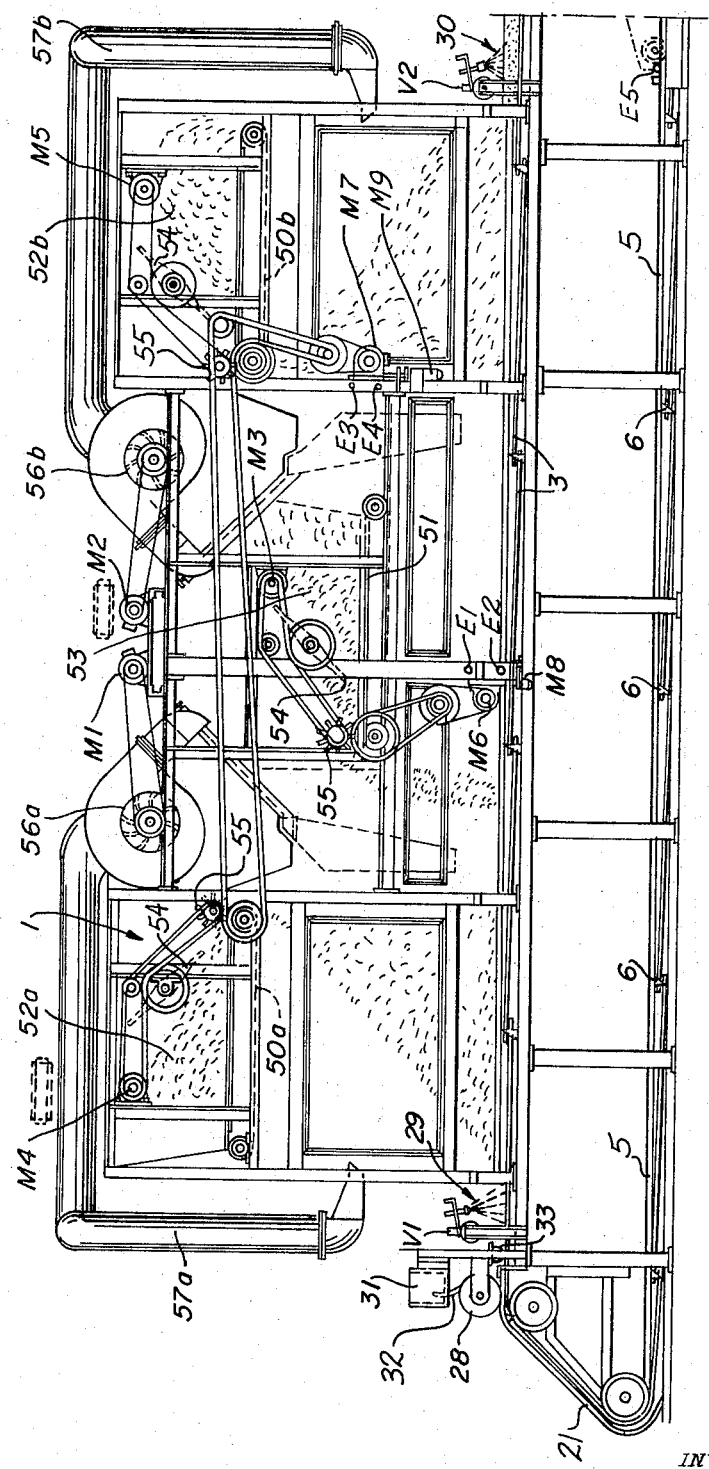
Figure 7:
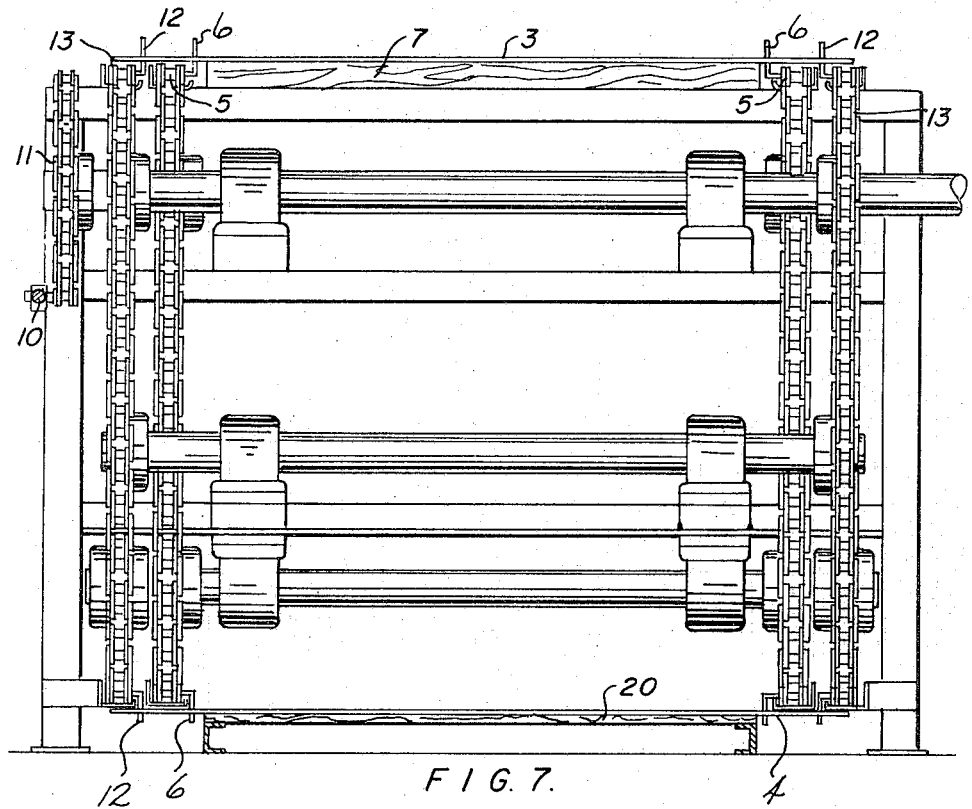
FIGURE 7 is a vertical transverse section taken on line 7—7 of FIGURE 5.
Figure 13A:
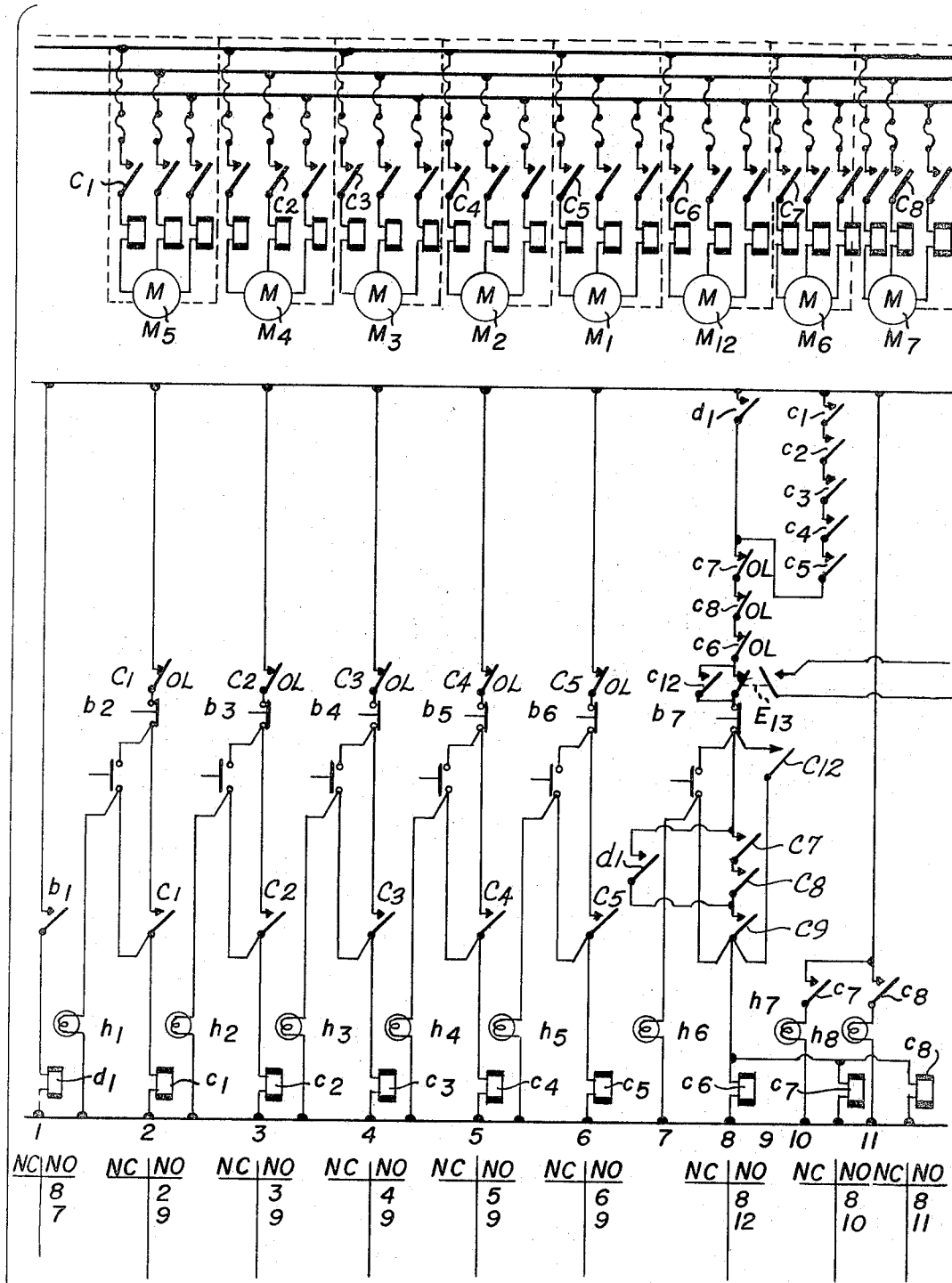
Figure 13B:
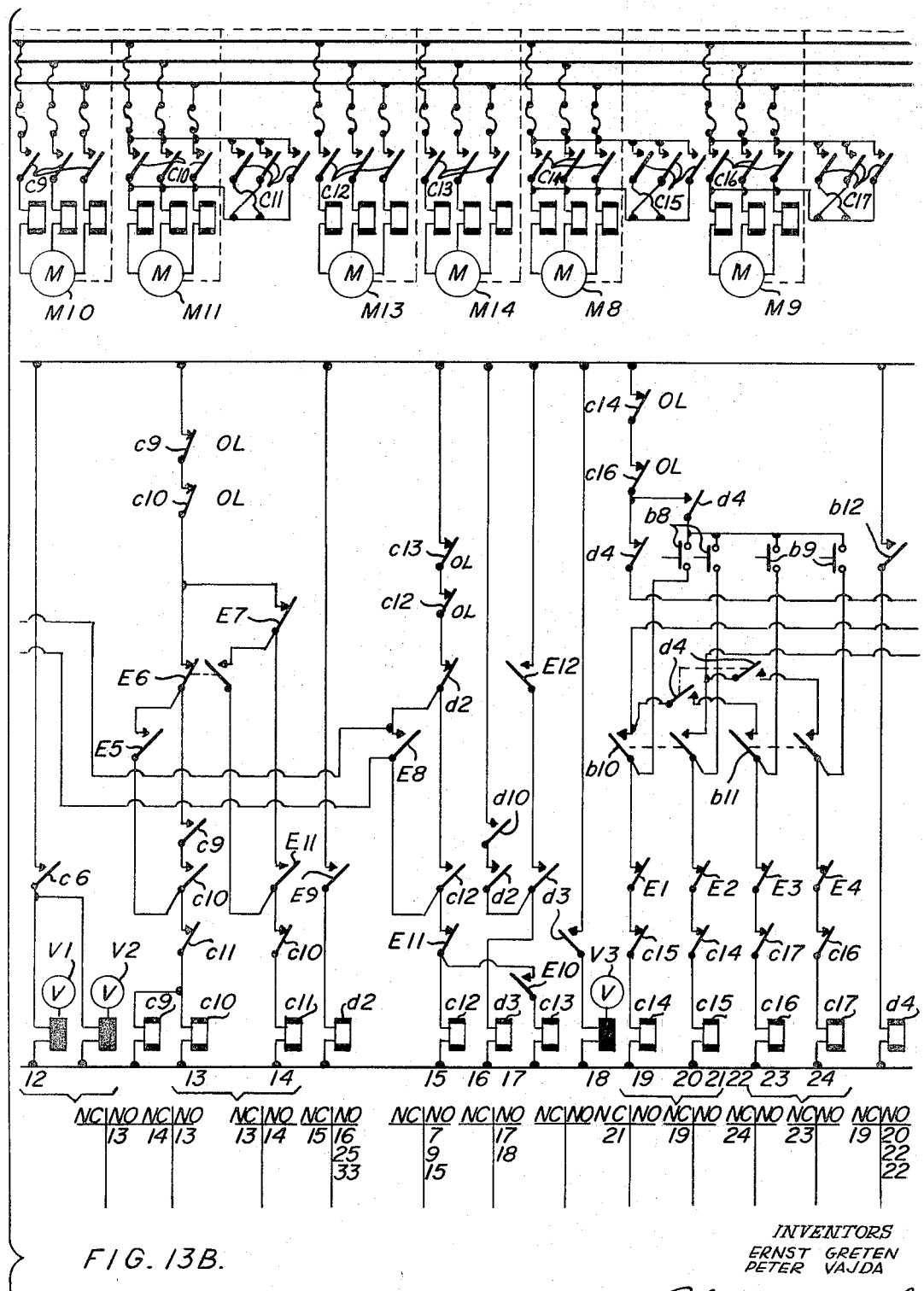
Figure 13C:
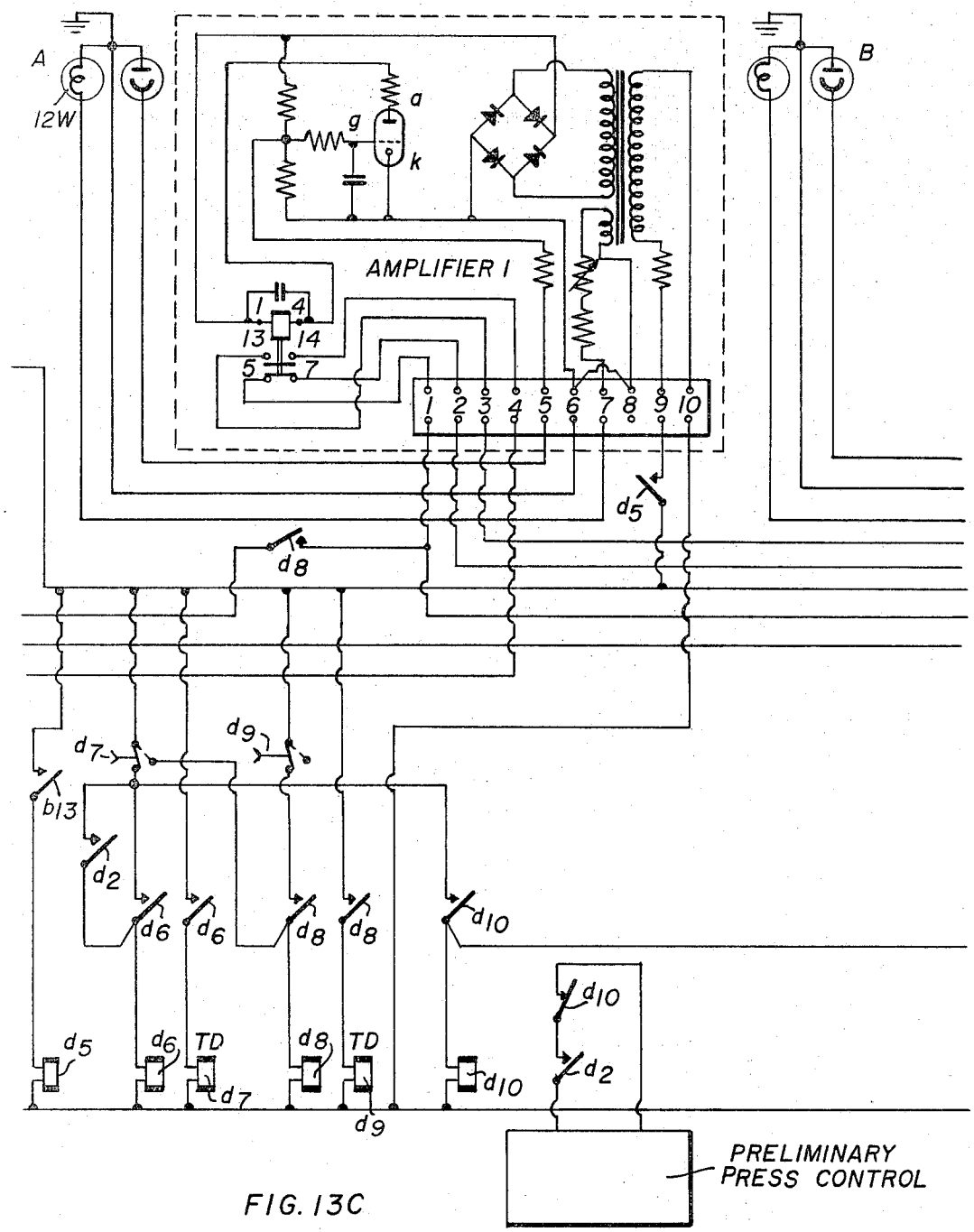
Figure 13D:
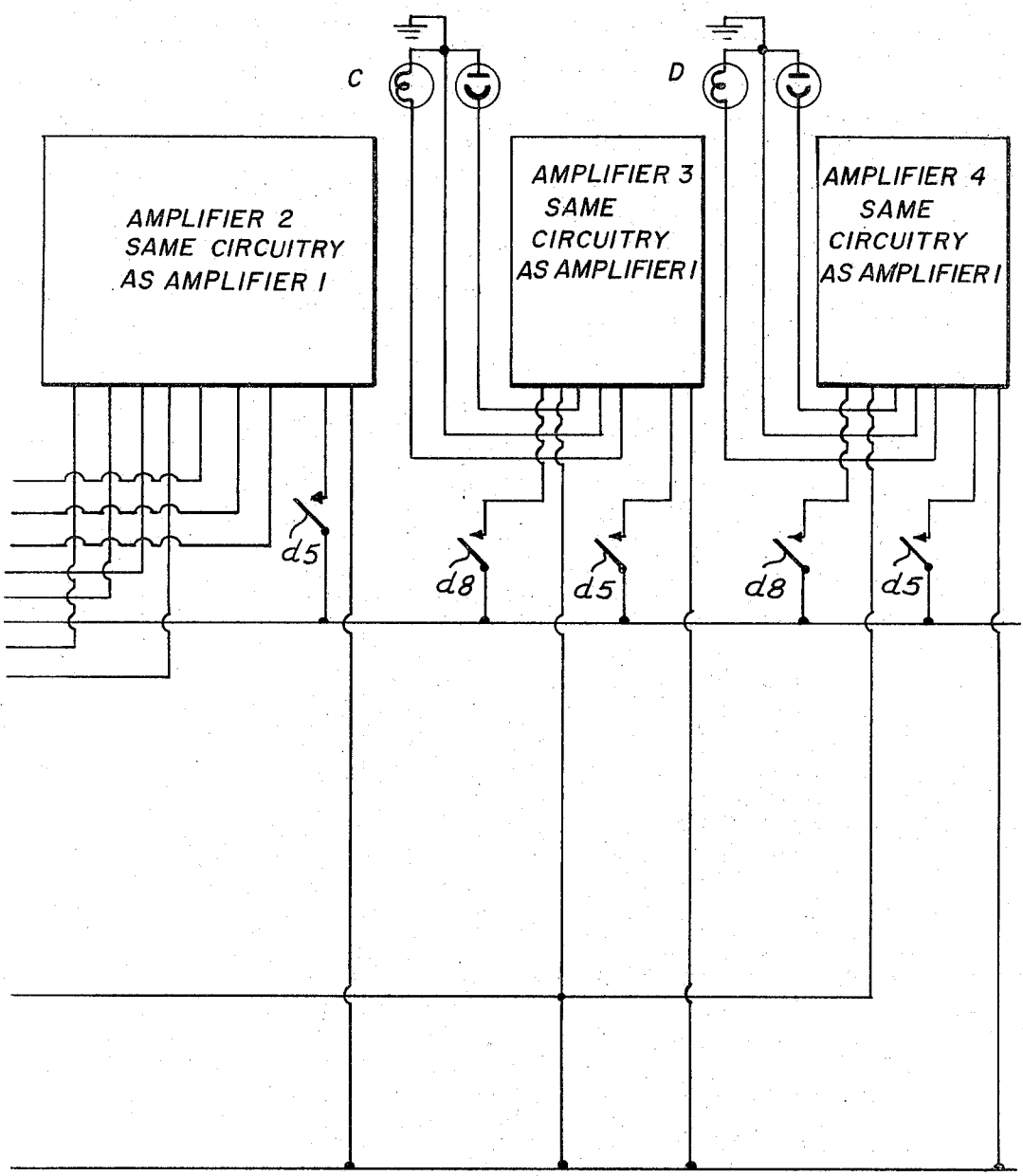

FIGURES 13A, 13B, 13C and 13D combined are an electrical circuit diagram for the installation in FIGURES 1A, 1B and 1C and FIGURES 2A, 2B and 2C.

FIGURE 14 is an elevation on a scale longer than FIGURES 1B and 2B, of the indicator head of the scale, in explanation of the electrical circuit diagram in FIGURES 13A, 13B 13C and 13D, and FIGURES 15A, 15B, 15C, and 15E are diagrammatic side elevations of portions of the finishing press illustrating sequential operations.

A. Mat and board forming section

Forming station 1 scatters wood flakes mixed with bonding agents 2 onto flexible carrier plates 3 advancing continuously in gapless sequence to form a continuous mat. Plastic foils, thin sheets or other flexible materials may be used as carrier plates. The carrier plates carry at their forward edge a bar 4 projecting on both sides and are moved by means of chains 5 fitted with carrier-hooks 6 which engage behind the bar, advancing the carrier plates on a slide-table 7 in the direction of operation. The conveyor chains are driven by a drive motor M12 via a drive 8. In order to reduce friction losses, the slide-table 7 may be provided with rollers, not shown, suitably spaced.

After leaving the forming station, the mat is cut into equal lengths at the joints of the carrier plates. The cutting device 9 is arranged to move along the conveyor in known fashion, and is driven by means of a transmission rod 10 via a chain 11 driven synchronously with the conveyor chains 5, said chain 11 being of the same length as one mat piece. After the cutting operation, the cutting device returns to its starting position and comes into action again at the subsequent location.

Shortly before the end of the conveyor chains 5, as shown by the zone a, the cut-off mat piece located on a support is taken over, while still in continuous motion, by the carrier-hooks 12 of the conveyor chains 13. When the preliminary press 14 is opened, the conveyor chains 13 are set in cyclic motion at a higher speed than conveyor chains 5, thus drawing the mat pieces 16 on to the scale 15, while the mat piece located on the scale is simultaneously drawn into the preliminary press 14. Conveyor chains 13 are driven by means of motor M13 via a drive 17. The bars 4 of the carrier plates 3 are guided behind the preliminary press 14 by guide-rails 18 in such a manner that they cannot release themselves from carrier-hooks 12 during their downward deflection. A guide plate 34, fitted to the deflection location, is arranged to deflect the carrier plates. The carrier plates are deflected downwardly, while the prepressed mat pieces are rolled, without support, on to the endless transfer belt 19 driven by the motor M14 at the same speed. Slide-table 20, which extends over the whole length of the installation, prevents the bars 4 from being released from the carrier-hooks 12 on the lower run of the chain, the carrier plates being therefore drawn forward cyclically as far as the continuously running conveyor chains 5. At that point, the carrier plates are released from the carrier-hooks by the oblique upward guidance of the conveyor chains 13, and are thereby deposited as shown by zone b. The released carrier-hook moves on upwardly until shortly before its deflection into the upper run of the chains. At the subsequent cycle, i.e. when the preliminary press has opened again and the conveyor chains 13 are drawn forward, said carrier-hooks take over the subsequent mat piece within area a, in order to pass it to the scale 15. The carrier plate deposited in area b is carried along by the carrier-hooks 6 which are released in area a of the upper run of the chain 5, passing to the lower run by the chain deflection. At the deflection location ahead of the forming station, guide-rails 21 are also fitted, so that the bars 4 cannot become unhooked from the chains. A plate fitted to the deflection location is arranged to deflect the flexible carrier plates.

The scale 15 is coupled, as described below in greater detail, by means of electric control devices to the preliminary press 14, forming station 1, and transfer belt 19. When a weighed mat piece exhibits an unacceptable weight difference, an electrical locking of the press control elements takes place after the preliminary press has opened, so that when such mat piece of improper weight is introduced into the press in this cycle, no pressing takes place. At the subsequent cycle, the transfer belt 19 located behind the press 14 is raised by the compressed-air cylinder 22. This exposes the shaft of a conveyor device 23, not described in any more detail, which accepts the loose material falling from the downwardly-guided carrier plate and returns it again to the forming location.

A rotating cleaning brush 24 cleans the surface of the carrier plates after the mat pieces have been released. At the same time, the speed of the floor belts 50a, 50b and 51 in the storage containers 52a, 52b and 53 of the forming station is adjusted by the action of adjusting motors M7 and M8, to provide the rated amount of flake material to be scattered.

The pre-pressed mat pieces are fed by conveyor belt 19 to a press-charging device 25 having a series of stacked belt conveyors 60 adapted to be raised and lowered. The belt conveyors 60 correspond in number and spacing with the levels 61 of the press of hot press 26. First the stacking device 25 is filled with preconsolidated mat pieces and then all of the stacked pieces are charged to the hot press 26 simultaneously.

Details of the transfer of the mat pieces from conveyors 60 to press 26 are shown in FIGURE 15. Thus it will be seen that the conveyors 60 are provided with smaller rollers 62 on their forward edges than on their opposite side edges and movable wedge-shape bars 63 are fixed to the conveyor adjacent the forward end thereof. When press 26 is opened, the press-charging device 25 travels into the press with the wedge-shape bars 63 in an upright position as shown in FIGURES 15A and B, so that the bars 63 serve to push the pressed boards 64 out of the press onto the board received device 27. Then the charging device commences to back out of the press and bars 63 swing down to the position shown in FIGURES 15C and D so as to serve as bridges for the passage of the fragile preconsolidated mat pieces over the conveyor rollers 62. FIGURE 15E shows the completion of the cycle with the charging device 25 removed from the press and the press closing.

The new process may be carried out in such a manner that shaped mat pieces may be continuously pressed by cold-pressing on very smooth, flexible carriers. Pressing of this kind produces extremely smooth pressed boards, since the high surface smoothness of the carrier plates acts not only to align the adjacent very small flakes, e.g. in a three-layer board, but also produces molecular smoothness in the sense of molecular alignment of the adhesives by the surface of the extremely smooth film of the closely adjacent, flexible plates. The extremely smooth film may be integral with the flexible plate. In order to obtain a particularly smooth surface, the flexible plate may also be coated with a special adherent film, or a foil may be applied or attached thereto. There is also the possibility of specially treating the surface of the carrier plates for the purpose of improving the surface of the pressing length. According to the invention, this is accomplished by passing the carrier plates entering into the forming station under a rotating polishing roll 28, by means of which surface-smooth substances which may simultaneously contain an anti-adhesive agent such as silicon, graphite, wax or similar substances, are applied to the carrier plates. The function of the pressure roll 33 is to smooth the carrier plates whenever these show any slight corrugation due to the deflection.

A container 31 for the polishing agent is provided above the polishing roll 28. The polishing agent is supplied to the polishing roller in small amounts by means of suitable supply tubes or absorbent wicks 32.

Following this are one or more spray devices 29 by means of which the prepared carrier plates are sprayed with a fluid film which, after the release of the plates, is permanently united with the shaped piece as a surface layer, thus constituting a surface improver. This method may be used not only for shaped pieces having level surfaces, but also for profiled surfaces, if supports having suitable surface polish are used therefor (FIGURE 10). FIGURES 11 and 12 show such shaped pieces by way of example.

In the manufacture of uncoated forms from wood flakes or the like, the spray devices 29, 30 serve the purpose of moistening the carrier plates and thus the undersides of the mat pieces. Such moistening results in smooth surfaces for the shaped pieces and increases the passage of heat through the cross section of the shaped piece during hot pressing.

B. *Forming station*

The storage containers 52a, 52b and 53 for the flake material are equipped with endless floor belts 50a, 50b and 51, driven by the motors M6 and M7. After the material has been levelled by the rotating scraper 54, these belts carry it against spiked rolls 55 which loosen it and scatter it on to the carrier plates 3 passing below the forming station. Material falling from the two outside containers 52a and 52b is subjected while falling to blown grading in such a manner that the fine particles form the top and bottom layers of the mat, while the coarse particles form the centre. For this purpose, fans 56a and 56b are provided, these being connected by circulating ducts 57a and 57b with the outer depositing chambers of the forming station and producing a current of air for the sorting of the flake material. The centre storage container 53 may be selectively adjusted so that the material is scattered without blown sorting. This material, which forms the centre layer of the mat, may differ in type and nature from the material distributed from the two outer storage containers 52a and 52b.

C. *Electrical circuits*

Fan motors M1 and M2 as well as scraper motors M3, M4 and M5 are switched on by means of rotating keys (b2) to (b6). As soon as these motors are running, motor M12, driving conveyor chains 5, may be switched on by means of rotating key (b7). Motor M6 driving feed belt 51, and motor M7, driving feed belt 50a and 50b, start up simultaneously with said motor M12. Solenoid valves V1 and V2 are also energized and activate spray devices 29 and 30. If one of motors M1 to M5 or M6 and M7 stop, motor M12 stops automatically, as do conveyor chains 5. If drive motor M12 for conveyor chains 5 stops by itself, motors M6 for feed belt 51 and motor M7 for feed belts 50a and 50b stop automatically. Similarly, spray device 29 and 30 is also shut down. By means of selector switch (b1), the automatic action outlined above may be eliminated, for example when making a test run of individual assemblies.

When cut-off saw 9 moves from its basic position outwards to the right, limit switch E5 is actuated. This switches on saw motor M10 and saw feed motor M11 for cutting the mat pieces. After it reaches limit switch E6, the direction of saw feed motor M11 is reversed, and when it again reaches limit switch E7, said motor is switched off. When the direction of motion is reversed by limit switch E6, saw motor M10 is simultaneously switched off. If for any reason motor M10 does not start up when limit switch E5 is actuated, saw feed motor M11 stops before reaching the mat piece.

If saw motor M10 stops during the cutting-off process, then saw feed motor M11 also stops.

When mat piece 16, with its front carrier-bar, reaches limit switch E8, its carrier plate, switches on motor M13 for conveyor chains 13, provided that preliminary press 14 is open. The determination as to whether the preliminary press is open or closed is made by limit switch E11. When drive motor M13 for conveyor chains 13 starts up, drive motor M14 for transfer belt 19 also starts up, provided that said transfer belt 19 is in the horizontal position. The determination of the position of the transfer belt is made by limit switch E10. After motor M13 for conveyor chains 13 has drawn mat piece 16 forward by one length, limit switch E9 is actuated; said limit switch, with the aid of an auxiliary switch (d2), exercising a fourfold function:

(1) Drive motor M13 for conveyor chains 13 is switched off.

(2) A pulse is given to raise transfer belt 19 by means of compressed-air cylinder 22, controlled by magnetic valve V3. This pulse is, however, effective only if scale 15 has already established the mat piece as a reject.

(3) A pulse is given to the control elements, not shown in greater detail, of preliminary press 14 to close said press. If scale 15 has already weighed mat piece 16 as a reject, this pulse is ineffective and press 14 mains open.

(4) A pulse is given for the initiation of the weighing process of scale 15.

If drive motor M13 for conveyor chains 13 does not start up when limit switch E8 is actuated, due to the fact that preliminary press 14 is still closed, then the carrier plate reaches limit swtich E13 and motor M12 for conveyor chains 5 is switched off and simultaneously gives a permanent pulse to start up motor M13 for conveyor chains 13 locked by the preliminary press. The automatic cycle resulting from the switching off of motor M12 for conveyor chains 5 has been described previously. After preliminary press 14 opens, motors M13 for conveyor chains 13 and, if necessary, motor M14 for transfer belt 19 start up automatically. At the same time, a contact on switch c12, a switching unit for motor M13 driving conveyor chains 13, switches on motor M12 for conveyor chains 5. If motor M13 for conveyor chains 13 starts up immediately when limit switch E8 is actuated, the limit switch E13 remains without function, being bridged by a contact of switch c12, and M12 is thus not switched off.

Scale 15 fulfills a dual function with respect to mats of improper weight:

(1) If the weight of a mat piece is *not* within the adjustable plus or minus tolerance range defined by photo-electric cells A and B (FIGURE 14), supply belts 50a, 50b and 51 feeding the forming station are adjusted, i.e. more or less chip material is discharged.

(2) If the weight of a mat piece is *not even* within the coarse tolerance range of photo-electric cells C and D (FIGURE 14), there occurs an additional locking of preliminary press 14, i.e. press 14 does not close at the next motion cycle of conveyor chain 13. Furthermore, transfer belt 19 is raised at this motion cycle by compressed-air cylinder 22, so that at the next-but-one motion cycle the unpressed mat piece located on the scale reaches removal shaft 23.

By means of selector switch (b12), the automatic control exerted by scale 15 on feed belts 50a, 50b and 51 in forming station 1 can be switched off, and manual control by means of press-keys (b8) and (b9) is now possible. This mechanism is required for basic adjustment of the speed of supply belts 50a, 50b and 51 when starting up or when changing production to another board thickness. In the case of automatic control, the following automatic operation may be determined with the aid of selector switches:

(1) When the thickness of the centre as well as both outer portions of a mat piece require adjustment feed belts 50a, 50b and 51 are adjusted in common;

(2) If only the thickness of the centre portion requires adjustment then only feed belt 51 need be adjusted; and (3) If only the thickness of the outer portions of the mat piece require adjustment feed belts 50a and 50b only are adjusted.

Indicator head 15a of scale 15 (FIG. 14) contains in essence the following parts:

(1) An indicating device in the form of a pointer (15a–1) shows the weight of the mat piece 16 on the scale (15a–5). A switch flag (15a–4) is attached to the pointer (15a–1) and passes through the interrogation of photo-electric cells A to D. The length of said switch-flag (15a–4) corresponds to the distance between the photo-electric cells A and B when the light-barrier carriers (15a–2) and (15a–3) are adjusted on the scale (15a–5) without a tolerance range, i.e. the indicator points lie together.

(2) A pair of scissor-like, crossed light-barrier carriers (15a–2) and (15a–3) which may be rotatably adjusted at will about the centerline of the pointer, indicate the set tolerance range on the scale (15a–5). Photo-electric cell A is permanently located on the light-barrier carrier (15a–2), just as photo-electric cell B is on light-barrier carrier (15a–3). Photo-electric cell C, located on light-barrier carrier (15a–2) is adjustable as regards distance from photo-electric cell A. Similarly photo-electric cell D on light-barrier carrier (15a–3) from photo-electric cell B.

The scale 15 is switched to "ready" by means of control switch (b13). As already stated, the weighing process is initiated by limit switch E9 via auxiliary switch (d2), i.e. said auxiliary switch (d2) switches on, via auxiliary switch (d6), a time-relay (d7) having a time of 1 to 10 seconds, adjustable at will. The time determined by said time-relay (d7) serves to co-ordinate the indicating device (15a–1) to the scale (15a–5). After the set time-relay (d7) has elapsed, said time-relay is switched off again by auxiliary switch (d6), and simultaneously gives a pulse to switch on auxiliary switch (d8). At this moment a voltage is imparted to terminal 1 on amplifiers 1 and 2 (see electric circuit diagram). According to the position of the indicating device (15a–1) and thus of the switch-flag (15a–4), there occurs the following interrogation of photo-electric cells A and B, see FIG. 14:

(1) If the signal flag (15a–4) is in both photo-electric cells A and B and has thus darkened them, the weight of the mat piece being weighed is within the acceptable tolerance range. No adjustment takes place.

(2) If as a result of the mat piece being underweight, the signal flag (15a–4) has darkened only the photo-electric cell A, the amplifier 1 passes current to adjusting motors M8 and M9, and these increase the speed of the feed belts 51, 50a and 50b.

(3) If as a result of the mat piece 16 being overweight, the signal flag (15a–4) has darkened only the photo-electric cell B, then amplifier 2 passes current to adjusting motors M8 and M9, and these reduce the speed of feed belts 51, 50a and 50b.

When auxiliary switch (d8) is switched on, a time-relay (d9) with an adjustable time of 1 to 10 seconds starts up simultaneously. The running time of said time-relay (d9) corresponds to the length of the eventual adjusting time of adjusting motors M8 and M9, i.e., if said time-relay (d9) is set to 5 seconds, then, if necessary, adjusting motors M8 and M9 will be actuated for 5 seconds in order to adjust the feed belts 51, 50a and 50b.

Limit switches E1 and E2 limit the running of motor M8 and thus its shifting action on motor M6. Limit switches E3 and E4 similarly limit the running of motor M9 and thus its shifting action on motor M7.

When the auxiliary switch (d8) is switched on, amplifiers 3 and 4 simultaneously receive current. If the photo-electric cells C or D (see FIG. 14) are darkened as a result of underweight or overweight, the auxiliary switch (d10) is switched on. This opens a contact on auxiliary switch (d10) in the control circuit of the press control which is not described in greater detail, so that the press does not close upon the next motion cycle of the conveyor chains 13. Simultaneously, an additional contact on the auxiliary switch (d10) in the switching-on line of the auxiliary switch (d3) closes, said auxiliary switch (d3) controlling the compressed-air cylinder 22 via magnetic valve V3. At the next opening of the press the limit switch E12, which takes over the function of holding contact for the auxiliary switch (d3), closes. Then, at the next motion cycle of the conveyor chains 13 when the auxiliary switch (d2) shorts, the auxiliary switch (d3) is switched on, and the transfer belt 19 is raised by the compressed-air cylinder 22. At the next motion cycle of the conveyor chains 13, the unpressed mat piece will be deposited in hopper 23 to be returned to the forming station.

In the motion cycle of the conveyor chains 13 just described, in which the time-relay (d7) again starts up, the auxiliary switch (d10) is switched off again after the set time has elapsed, and the locking of the press is removed. Now when the scale 15 has established the rated weight of the weighed mat, the press can close again at the next motion cycle of the conveyor chains 13. The closing of the press again frees the limit switch (E12), the magnetic valve (V3) is de-energized by the auxiliary switch (d3), and the transfer belt 19 drops to its normal position.

Thus, the process and apparatus of this invention have as their most important advantage the ability to produce particle boards completely automatically and on a continuous basis on a totally integrated machine such that no extraneous parts are required which are not at all times integral with the machine during its operation.

We claim as our invention:

1. An apparatus for the manufacture of boards from particles comprising particle-dispensing means at a forming station adapted to deposit particles for forming a mat, separating means adapted to separate a mat formed by said particle-dispensing means into sections of predetermined lengths, preliminary pressing means, weighing means located between said particle-dispensing means and said preliminary pressing means, further pressing means located beyond said preliminary pressing means, transport means for moving a mat from said forming station successively to said weighing means, said preliminary pressing means and said further pressing means and including a section between said preliminary pressing means and said further pressing means movable upward above the normal path of movement of the mat from said preliminary pressing means toward said further pressing means, preliminary press control means operated by said weighing means to suspend operation of said preliminary pressing means in open position when a mat of undesired weight has been moved into registry with said preliminary pressing means by said transport means, and mat-rejecting means including a hopper beneath said upwardly movable section of said transport means and means to move upward said upwardly movable section of said transport means when a mat section of undesired weight has been detected for dumping such mat section from the open preliminary pressing means into said hopper.

2. The apparatus defined in claim 1, in which the means to move upward the upwardly movable section of the transport means is connected to the weighing means, and the mat-rejecting means further includes photoelectric cells energizable by said weighing means to operate the preliminary press control means to suspend operation of the preliminary pressing means and to energize the means for moving the upwardly movable section of the transport means to move such section upward.

3. An apparatus according to claim 1, wherein the carrier means have a contoured surface.

4. An apparatus according to claim 3, wherein the contoured surface is movably fixed on a main plate.

5. An apparatus according to claim 3, wherein the contoured surface is movably fixed on a main plate and is adapted to be pressed by the further pressing means with the mat section which it carries.

6. An apparatus according to claim 5, wherein the transport means to the further pressing means has the same contour as the contoured surface.

7. An apparatus according to claim 3, wherein the pressing surfaces of the further pressing means have the same contour as the carrier means.

References Cited by the Examiner
UNITED STATES PATENTS

| | | |
|---|---|---|
| 1,835,914 | 12/1931 | Stockdale. |
| 2,637,888 | 5/1953 | Bushore. |
| 2,712,408 | 7/1955 | Weber _____ 222—55 X |
| 2,719,328 | 10/1955 | Patton et al. _____ 264—120 |
| 2,835,016 | 5/1958 | Dixon. |
| 2,873,475 | 2/1959 | Linhorst _____ 18—4 |
| 2,881,516 | 4/1959 | Hull et al. _____ 29—407 |
| 2,923,030 | 2/1960 | Himmelheber et al. _____ 18—4 |
| 3,019,479 | 2/1962 | Erickson et al. _____ 18—4 |
| 3,050,782 | 8/1962 | Meiler _____ 264—120 |
| 3,070,838 | 1/1963 | Hostettler _____ 18—4 |
| 3,173,976 | 3/1965 | Paerels et al. _____ 18—4 |
| 3,183,287 | 5/1965 | Fischer _____ 18—4 X |
| 3,205,958 | 9/1965 | Thompson et al. ___ 209—121 X |

WILLIAM J. STEPHENSON, *Primary Examiner.*

ROBERT F. WHITE, *Examiner.*

J. R. HALL, *Assistant Examiner.*